United States Patent
Illing et al.

(10) Patent No.: US 9,539,858 B2
(45) Date of Patent: Jan. 10, 2017

(54) SHIELD FOR A CASTER WHEEL

(71) Applicants: Radoslaw Illing, Warsaw (PL); Renata Olszewska-Illing, Warsaw (PL)

(72) Inventors: Radoslaw Illing, Warsaw (PL); Renata Olszewska-Illing, Warsaw (PL)

( * ) Notice: Subject to any disclaimer, the term of this patent is extended or adjusted under 35 U.S.C. 154(b) by 0 days.

(21) Appl. No.: 14/703,400

(22) Filed: May 4, 2015

(65) Prior Publication Data

US 2015/0328926 A1 Nov. 19, 2015

(30) Foreign Application Priority Data

May 13, 2014 (GB) .................................. 1408454.5

(51) Int. Cl.
*B60B 33/00* (2006.01)

(52) U.S. Cl.
CPC ........... *B60B 33/00* (2013.01); *B60B 33/0026* (2013.01); *B60B 2200/20* (2013.01); *B60B 2900/212* (2013.01); *B60B 2900/3312* (2013.01); *B60B 2900/531* (2013.01); *Y10T 16/216* (2015.01)

(58) Field of Classification Search
CPC .... Y10T 16/207; Y10T 16/216; Y10T 16/184; B60B 33/00; B60B 33/0002; B60B 33/006; B60B 7/00; B60B 7/06; B60B 7/061; A47B 91/00; A47B 91/12; A47B 95/043; A47B 2095/046; A47C 19/024
See application file for complete search history.

(56) References Cited

U.S. PATENT DOCUMENTS

| | | | | |
|---|---|---|---|---|
| 672,138 | A * | 4/1901 | Stockwell | B60B 33/00 15/264 |
| 1,595,582 | A * | 8/1926 | Stedman | B60B 33/00 16/18 CG |
| 1,669,165 | A * | 5/1928 | Jarvis | B60B 33/0028 16/18 CG |
| 1,906,590 | A * | 5/1933 | Hewson | B60B 33/00 16/18 CG |
| 2,290,001 | A * | 7/1942 | Sherman | B60B 33/0002 16/18 CG |
| 2,471,958 | A * | 5/1949 | Humphreys | B60B 33/00 16/18 CG |
| 2,483,241 | A | 9/1949 | Shepherd | |
| 2,613,389 | A * | 10/1952 | Cramer | B60B 33/06 16/18 CG |
| 2,981,969 | A | 5/1961 | Fontana | |

(Continued)

FOREIGN PATENT DOCUMENTS

| | | |
|---|---|---|
| CN | 202180706 | 4/2012 |
| TW | 201144099 | 12/2011 |

OTHER PUBLICATIONS

United Kingdom Search Report in Application No. GB1408454.5 dated Nov. 25, 2014.

*Primary Examiner* — Chuck Mah

(74) *Attorney, Agent, or Firm* — Wenderoth, Lind & Ponack, L.L.P.

(57) ABSTRACT

A shield 1 for a caster wheel that forms part of a wheeled object, comprising: a perimeter wall 2 configured to extend substantially fully around the caster wheel, and; a connection and supporting means 5, 205 configured to extend from the perimeter wall 2 to connect the shield 1 to the wheeled object; the perimeter wall 2 comprising a resiliently deformable portion 4 that extends substantially fully around the perimeter wall.

13 Claims, 9 Drawing Sheets

(56) References Cited

U.S. PATENT DOCUMENTS

| | | | | |
|---|---|---|---|---|
| 3,163,437 A | * | 12/1964 | Phillipson | A63C 11/24 |
| | | | | 135/77 |
| 3,199,886 A | * | 8/1965 | Dover | A63C 11/222 |
| | | | | 135/84 |
| 3,289,685 A | * | 12/1966 | McCall | A61H 3/0244 |
| | | | | 135/65 |
| 3,345,675 A | * | 10/1967 | Haydock | B60B 33/00 |
| | | | | 16/18 CG |
| 3,441,974 A | * | 5/1969 | Dean | A47B 91/028 |
| | | | | 16/18 R |
| 3,731,698 A | * | 5/1973 | Buchalter | A45B 9/04 |
| | | | | 135/84 |
| 4,323,610 A | | 4/1982 | Leverich | |
| 4,800,617 A | * | 1/1989 | Yeh | B60B 33/0089 |
| | | | | 16/18 CG |
| 5,001,808 A | * | 3/1991 | Chung | B60B 33/06 |
| | | | | 16/18 CG |
| 5,123,143 A | | 6/1992 | Carmack | |
| 5,173,990 A | * | 12/1992 | Owen | B60B 33/0002 |
| | | | | 16/18 CG |
| 5,371,920 A | * | 12/1994 | Rainville | B60B 33/00 |
| | | | | 128/203.12 |
| D384,577 S | * | 10/1997 | Gaughan | D8/375 |
| 6,125,504 A | | 10/2000 | Richards | |
| 6,418,578 B1 | * | 7/2002 | Polevoy | A47B 91/00 |
| | | | | 16/18 CG |
| 6,647,589 B1 | * | 11/2003 | Youngwith | A47C 7/002 |
| | | | | 16/18 CG |
| 6,877,520 B2 | * | 4/2005 | Morris | A61H 3/0288 |
| | | | | 135/77 |
| D650,262 S | * | 12/2011 | Hinkle, III | D8/374 |
| 8,262,038 B1 | * | 9/2012 | Hallet | A47B 91/022 |
| | | | | 248/188.2 |
| 8,434,790 B2 | * | 5/2013 | Lenhart | A45B 9/04 |
| | | | | 280/824 |
| 9,283,136 B2 | * | 3/2016 | Jie | A61H 3/04 |
| D764,161 S | * | 8/2016 | Vasilatos | D3/17 |
| 2001/0019096 A1 | * | 9/2001 | Andreoli | F16M 7/00 |
| | | | | 248/188.8 |
| 2004/0088821 A1 | * | 5/2004 | Imperato | A47C 19/024 |
| | | | | 16/18 CG |
| 2011/0291534 A1 | * | 12/2011 | Li | B60B 7/02 |
| | | | | 312/249.8 |
| 2013/0097808 A1 | | 4/2013 | Long | |
| 2014/0008888 A1 | | 1/2014 | Fink | |
| 2014/0373887 A1 | * | 12/2014 | Gray | A45B 9/04 |
| | | | | 135/77 |

* cited by examiner

SHIELD FOR A CASTER WHEEL

The present application claims priority to GB1408454.5, the entirety of which is expressly incorporated herein by reference.

FIELD OF THE INVENTION

The present invention relates to a shield for a caster wheel, in particular the invention relates to a shield that shields the caster wheel from contact with other objects. More particularly, but not exclusively, the present invention relates to a shield for a caster wheel on a chair and similar wheeled furniture.

BACKGROUND

Caster wheels are extensively used on various devices such as office chairs and supermarket trollies. When used on office chairs, they allow a user to move a chair quickly and easily, even when the user is sat on the chair. This is advantageous when moving away or towards a desk.

It is relatively common when moving a chair whilst sitting on it, for a person to inadvertently position or leave their feet in the path of the caster wheels or for the wheels to move in an unexpected manner. This can lead to a wheel impacting or running over the person's feet or damaging their shoes.

PRIOR ART

A number of designs have been proposed in an attempt to resolve that problem. Some of these are described in the following:

Chinese Utility Model CN-A-202180706U (He) discloses a wheel structure with a fixing screw and wheel that are arranged on a wheel cover.

Taiwanese Patent Application TW-A-201144099 (Hon Hai Prec Ind Co Ltd) discloses an apparatus for stopping a device having a support member, a connecting member and a wheel fixed to the connecting member.

U.S. Pat. No. 4,323,610 (Leverich) discloses protective devices for the legs and feet of furniture and equipment items and comprises a protective sleeve for enclosing a foot.

U.S. Pat. No. 6,125,504 (Richards) discloses a universal caster cover with an adhesive tape mounted on an inside top of the cover and is used to attach the cover to a non rolling part of the caster.

United States Patent Application US-A-2013/0097808 (Long et al) discloses a protective bumper that attaches to a caster wheel assembly and substantially surrounds the assembly to act as a point of contact with other objects or articles.

United States Patent Application US-A-2014/0008888 (Fink et al) discloses a guard assembly for securement to a wheeled base comprising: a central support, a plurality of wheel guards positioned in an array around the central support, a plurality of struts and a plurality of support struts.

U.S. Pat. No. 2,483,241 (Shepherd) describes a caster guard adapted to be removably mounted on a caster. The guard has a frame with a partially circular bearing housing and depending legs. A stem extends upwards from the frame and axially from the housing. A roller is supported between the legs. The guard comprises a one-piece hood adapted to be removably supported on the frame and has a top wall adapted to rest on the frame and a depending perimetrical skirt portion that extends around the top wall to enclose the lower portion of the caster.

U.S. Pat. No. 2,981,969 (Fontana) describes and shows, a cup-shaped protecting guard extending downwardly over a caster wheel.

U.S. Pat. No. 5,123,143 (Carmack) describes and shows a protective cover comprising a semi-rigid, foam cylinder with an opening along the bottom of the cylinder to form two base edges. A hole is located in the cylinder diametrically opposite said base edges and at an equal distance from each end for a castor support shaft to pass therethrough. A circumferential slit is formed in the cylinder from the hole to one base edge. A castor is thereby enclosed to create a protective device that prevents or reduces injury when collision occurs with the castor.

In contrast the present invention provides a caster wheel shielding device to extend around a caster wheel to assist with preventing damage to other objects, such as scuffing to shoes.

SUMMARY OF THE INVENTION

According to the present invention there is provided a shield for a caster wheel comprises: a perimeter wall extending substantially fully around the wheel, the perimeter wall includes at least one resiliently deformable portion, a connection and a supporting means, the supporting means comprising at least one extension arm configured to extend from the perimeter wall to connect the shield to the caster wheel.

Advantageously in this way the shield ensures a caster wheel, such as that on an office chair, is at least partially encased by the shield so that a user does not catch their shoe on the caster wheel(s), whilst permitting the caster wheel to roll freely thus not limiting manoeuvrability.

Preferably the resiliently deformable portion extends substantially fully around the perimeter wall provide a cushion against which a shoe can rest or brush against without becoming damaged or tarnished.

Typically the perimeter wall is continuous and the resiliently deformable portion surrounds or covers all or part of the perimeter wall.

Preferably the connection and supporting means comprises at least one extension arm that extends from the perimeter wall, preferably inwards and upwards from the top of the perimeter wall, to connect the shield to the wheeled object. This provides a simple and robust construction.

Preferably where the shield has plural extension arms, the upper ends of the arms, namely those distal to the perimeter wall, meet to create a single extension or upper end.

Preferably the upper end of the extension arm comprises a hole configured to receive a connector portion therethrough. This allows the caster wheel shield to be simply and easily connected to a wheeled object; wherein the caster wheel typically has a central bore mounting, comprising the connector portion.

Preferably the caster wheel shield comprises a plurality of extension arms spaced around the perimeter wall that extend to the upper end with the hole for receiving the connector portion. This provides a simple and robust construction that will stay centred over the caster wheel when pressure or force is exerted to any part, for example one side.

Preferably there are three extension arms regularly spaced around the perimeter wall. This provides a good spacing and spread of reaction force for centring the caster wheel shield if force is applied to one side.

In some preferred embodiments the extension arm extends around the top edge of the perimeter wall to describe a dome. This provides an alternative robust and simple construction and surrounds the wheel to prevent contact from a plurality of directions. In this way there is no spacing through which a user could come into contact with the caster wheel.

Preferably the perimeter wall and at least one extension arm are formed as a unitary item. This helps to keep the structure of the caster wheel shield simple and enables the shield to be readily produced in large numbers. For example the shield may be formed from a mould.

Preferably in some embodiments the perimeter wall and at least one extension arm are formed from a synthetic plastic. This is an inexpensive, lightweight and readily available material that is robust and easily formed.

Preferably in some embodiments the perimeter wall and at least one extension arm are formed from metal/metal alloy or include a metal/metal alloy portion. Advantageously this may provide added strength and durability. This is an inexpensive and readily available material that is robust and easily formed.

In some embodiments the perimeter wall may comprise a metal or metal alloy core that is coated with a synthetic plastic.

Preferably the resiliently deformable portion comprises rubber, silicone or elastomer or a microfibre or padding cushion, or a combination thereof. Preferably the resiliently deformable portion has a rounded outer face so as to have smooth edges exposed. Ideally an inner face of the resiliently deformable portion is adapted to be received by the perimeter wall. For example the perimeter wall preferably includes a recess for receiving the resiliently deformable portion and the inner face of the resiliently deformable portion is shaped to correspond with shape of the recess.

In some embodiments the resiliently deformable portion comprises a band with an oval cross section. This provides good cushioning and resilience while retaining its shape and reliability over time.

In all preferred embodiments the cushion is envisaged to be neutral to the surface of the shoe regardless of whether it is made of leather, suede, silk or other material, for example being provided in a pliant and shiny material.

Preferably the resiliently deformable portion is displaceable wherein the resiliently deformable portion can be removed and replaced. Advantageously the resiliently deformable portions are interchangeable and this permits the resiliently deformable portion to be replaced if damaged or for different types or colours of resiliently deformable portion to be used.

Typically the resiliently deformable portion is mounted externally. Ideally the resiliently deformable portion is flexible and elastic so that it may be stretched in order to position it on the shield and to ensure it is held securely in place.

Preferably the resiliently deformable portion is formed from an elastic material that is also suitable to provide a cushion, such as rubber.

In some embodiments the resiliently deformable portion is mounted internally wherein a substantially durable outer surface is enabled to absorb impacts.

In preferred embodiments the portion extends substantially fully around the wheel and is continuous.

In some other embodiments plural resiliently deformable portions are dispersed about the perimeter wall.

In yet further embodiments the portion is corrugated or includes raised and lowered portions.

Preferably in some further embodiments the resiliently deformable portion comprises an elasticated backing band, the cushion connected to the outer face of the elasticated backing band, the elasticated backing band contracting to hold the resiliently deformable portion in position on the perimeter wall, and extendible to remove the resiliently deformable portion from the perimeter wall. This provides a simple construction that allows the resiliently deformable portion to be easily connected to the caster wheel shield for assembly, and removed as necessary or after wear.

Preferably the perimeter wall is formed with a depression or recess running around the perimeter wall, to help to keep the resiliently deformable portion in position during use. Such depression may be bevelled, scalloped or semi-oval in section.

In preferred embodiments the depression or recess includes an aperture. In this way a user is able to push their finger or another object through the aperture in order to displace the resiliently deformable portion so as to aid with its removal. Advantageously this helps the user to easily remove the resiliently deformable portion without causing damage.

In another variation, the shield could also have a number of bolts that extend inwards from the inner face of the perimeter wall configured to connect to the caster wheel to hold the shield in position and which help to keep the shield centred during use. The inner ends of these could also be located against the sides of a caster wheel if the wheel is of the type that has non-moving sides, to hold the shield in position. This provides another form of robust connection of the caster wheel shield to the wheeled object.

In this way the shield is maintained centrally about the caster wheel. The bolts may be spring loaded to maintain the shield in position. This provides another form of robust connection of the caster wheel shield to the wheeled object.

It is envisaged that the shield may be used on various wheel objections in particular but not exclusively caster wheels on chairs, tables, sit-on toys and furniture.

Preferred embodiments of the invention will now be described, by way of example and with reference to the Figures in which:

DETAILED DESCRIPTION OF FIGURES

Figure 1:
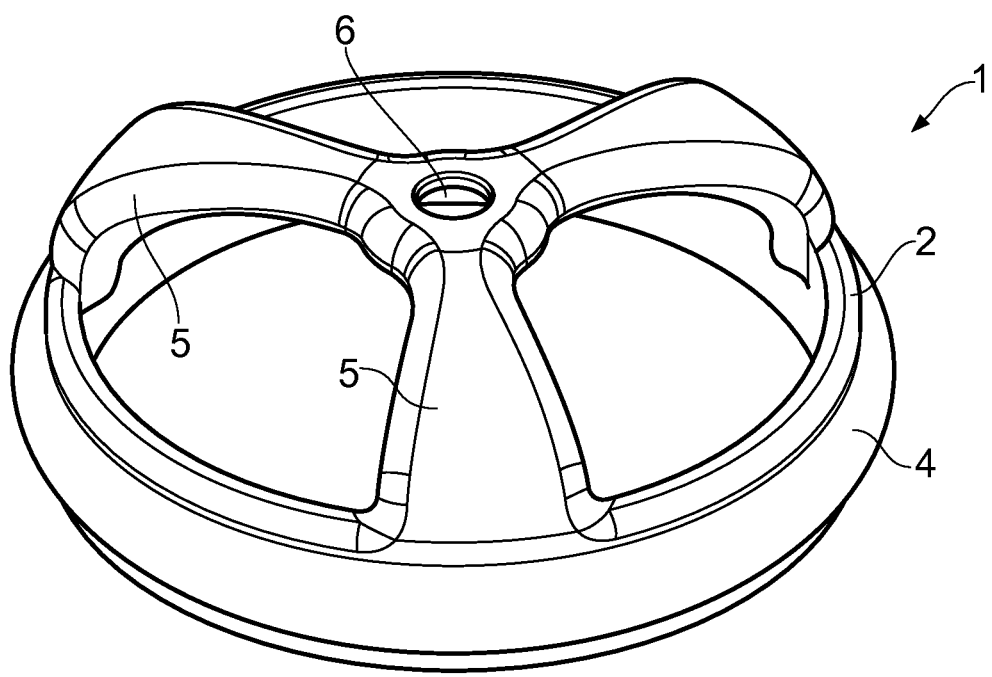
FIG. 1 shows a perspective view from above and to one side of an embodiment of the caster wheel shield of the present invention.

Embodiments of the shield for a caster wheel of the present invention will now be described with reference to the figures.

The embodiment of shield 1 for a caster wheel described below is for use with an office chair. The shield 1 is connected at the end of one of the legs of the chair so that the wheel is contained within the shield as the chair moves on the wheel in use. The shield has a perimeter wall 2 configured to extend substantially fully around the wheel (not shown). Three extension arms 5 extend inwards and upwards from the top of the perimeter wall 2 to connect the shield 1 to a chair (not shown) or other wheeled object.

A resiliently deformable portion 4 extends substantially fully around the perimeter wall 2. This serves to provide a surface against which a shoe may brush or rest against without becoming damaged or tarnished.

When connected to the chair leg, the shield 1 for a caster wheel has a perimeter wall 2 that extends around the wheel, clear of the floor surface, at around mid-height or the mid-point of the wheel. In plan view, the wall forms an unbroken circle. Three extension arms 5 extend upwards from the top lip or edge of the perimeter wall 2, inwards and upwards to the centre of the circle, meeting and merging in the centre of the circle.

A hole 6 is formed at the centre of the circle, on the axis of the circle that forms the perimeter wall. In use, the connector portion or connector extension of a caster wheel passes through the hole into the leg of an associated chair so that the wheel is connected to the chair. This allows the perimeter wall 2 to be connected to and supported by the chair leg and caster wheel, with the perimeter wall 2 surrounding the wheel. The arms 5 and hole (or aperture) 6 together form a connection and supporting means for the shield 1. The three arms are spaced at generally equal intervals around the perimeter upper edge of the perimeter wall 2, in order to provide a good spacing and spread of reaction force for re-centring the shield if the chair bumps into an object. The bump applies a force on the perimeter wall 2 at one side, and the spread of the arms ensures that the reaction force helps to keep displacement of the perimeter wall 2 minimised.

The perimeter wall 2 and the extension arms 5 are formed as a unitary item. They can be formed form plastic, by injection moulding or similar, or from metal such as aluminium or steel. These are readily available and easily formed materials.

A microfibre cushion 4 is connected in use to the perimeter wall to extend horizontally all around the outside of the perimeter wall, forming a resiliently deformable portion on the wall. The microfibre cushion 4 has an elasticated backing band (not shown), the microfibre cushion 4 connected to the outer face of the elasticated backing band. The elasticated backing band can be extended and contracted with the cushion 4 connected.

In use, the elasticated backing band is extended to increase the perimeter, and the elasticated backing band is slipped over and into position on the perimeter wall 2, contracting once the extending force is removed to contract onto the outside surface of the perimeter wall 2. This provides a simple construction that allows such resiliently deformable portion to be easily connected to the shield for assembly, and removed as necessary. The microfibre cushion 4 provides good cushioning and resilience on the outside of the perimeter wall, while retaining its shape and reliability.

It is appreciated that in some embodiments the resiliently deformable portion 4 may comprise an elastic band wherein the resiliently deformable portion 4 is formed for an elastic material that is also suitable as a cushion.

Figure 2:
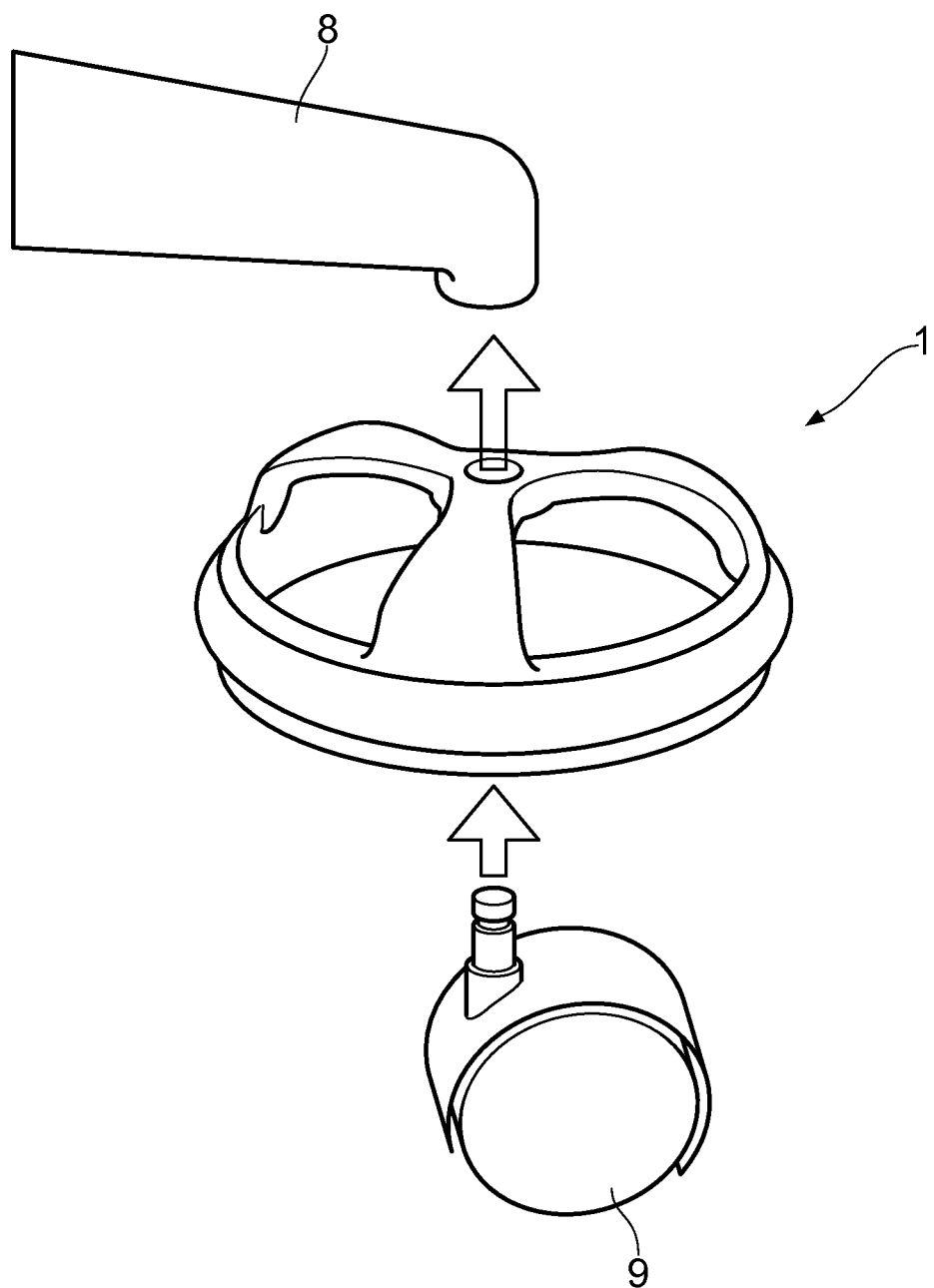
FIG. 2 shows an exploded perspective view from one side of the caster wheel shield of FIG. 1.

FIG. 2 shows the shield 1 placed in position at an end of an office chair leg 8. A caster wheel 9 connects inside and through the shield 1 to the end of the chair leg 8. In this way the caster wheel shield 1 is fixed securely about the caster wheel 9.

Figure 3:
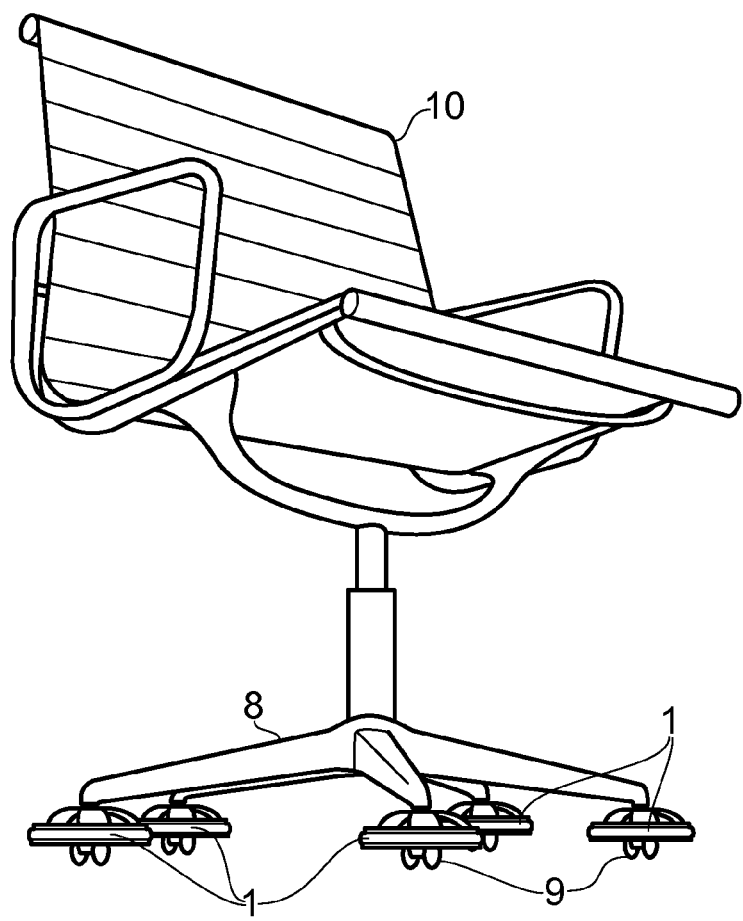
FIG. 3 shows an office chair fitted with the shields of FIGS. 1 and 2 on all five legs.
Figure 4:
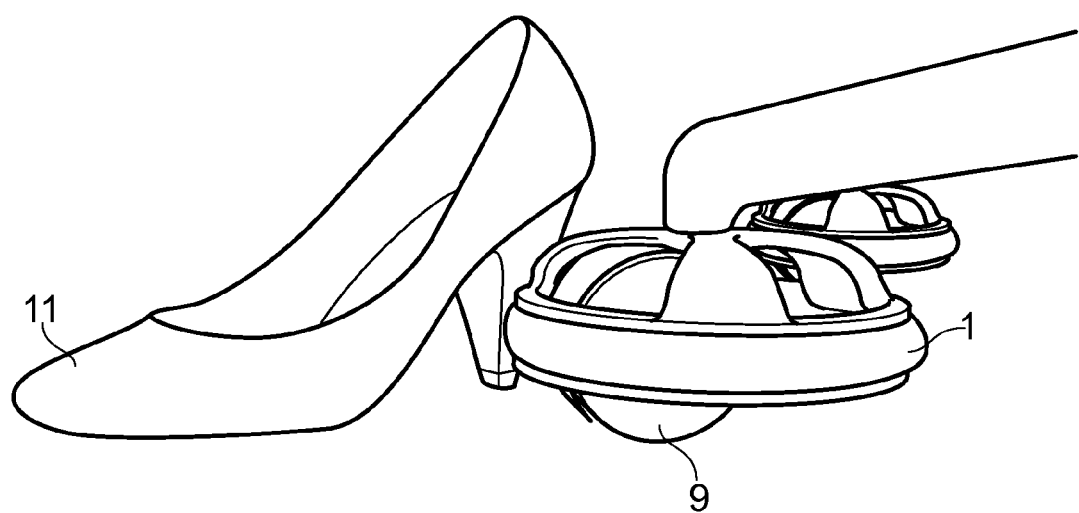
FIG. 4 shows in detail an end of one of the legs of the chair of FIG. 3 with the shield fitted, a shoe located adjacent the end of the leg and shielded by the shield from the caster wheel.

FIGS. 3 and 4 show the shields 1 fitted to an office chair 10. In FIG. 4 a shoe 11 is positioned adjacent to an office chair caster wheel with the shield 1 fitted to indicate how the resiliently deformable portion 4 protects the shoe 11 from damage caused by the caster wheel.

Figure 5:
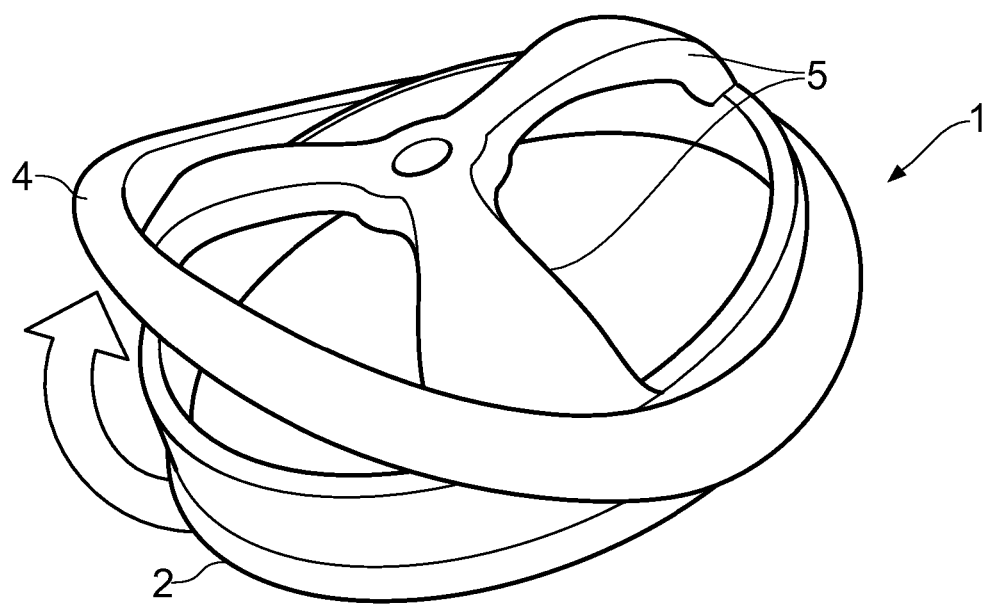
FIG. 5 shows the caster wheel shield of FIGS. 1 to 4 with the resiliently deformable portion partially removed.
Figure 7:
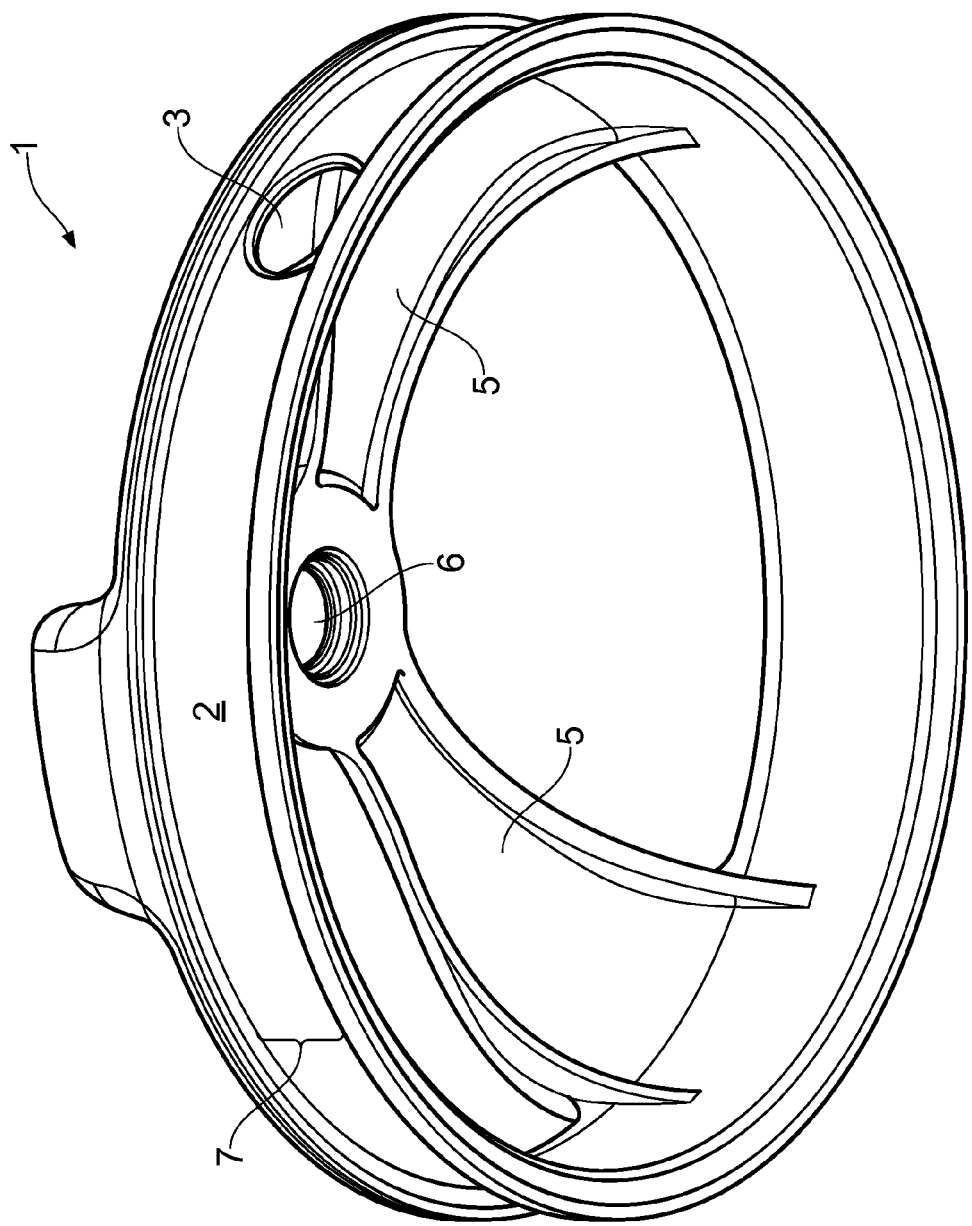
FIG. 7 shows a perspective view from below of the shield of FIG. 6? with the resiliently deformable portion removed revealing an aperture to aid with removal of the resiliently deformable portion.
Figure 10:
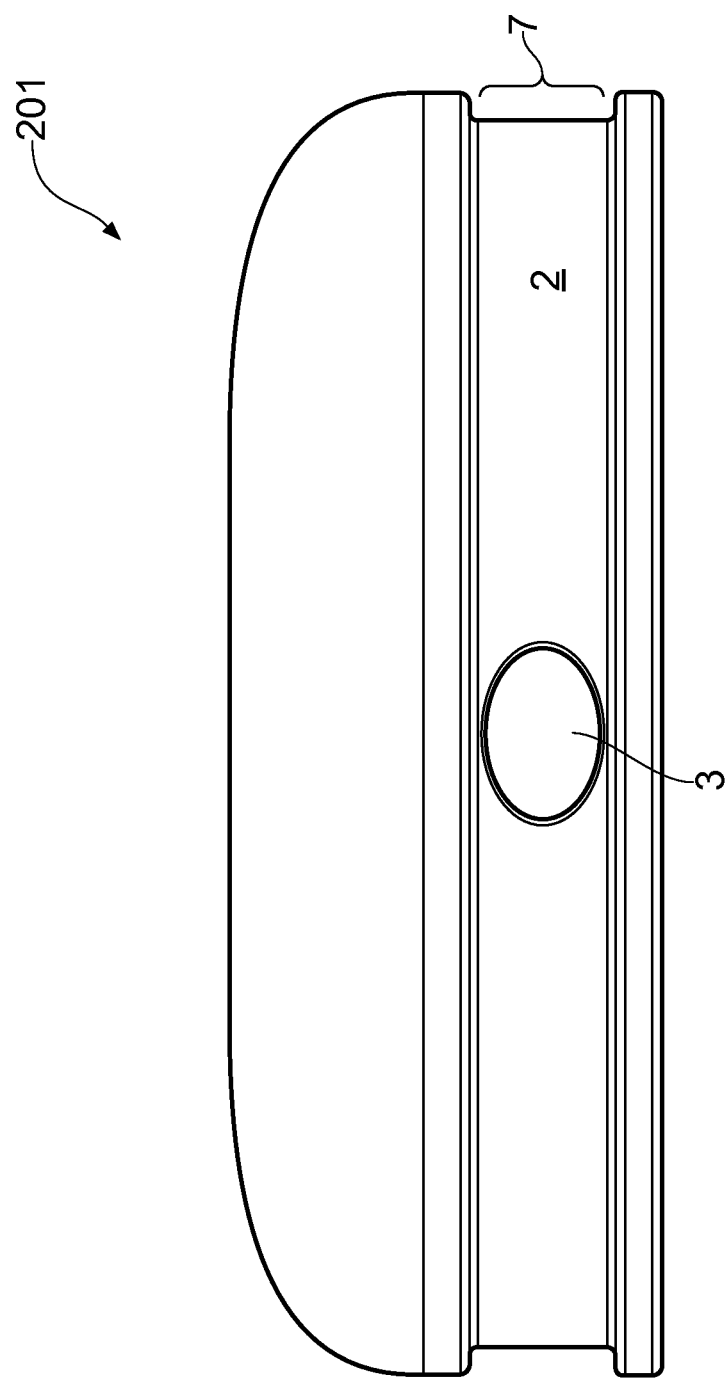
FIG. 10 shows a side view of the embodiment shown in FIG. 8 and FIG. 9 with the resiliently deformable portion removed.

In the embodiments shown in FIG. 5, FIG. 7 and FIG. 10, the perimeter wall 2 is formed with a central depression or recess 7 running around the outer surface of the perimeter wall, the width or height of the central depression 7 matched to the width of the cushion 4 or at least the elasticated backing band so the elasticated backing band slips into the central depression. The recess 7 helps to keep the resiliently deformable portion/microfibre cushion 4 in position during use but promotes displacement under minimal urging.

The cushion is formed with shaping to both provide a minimal outer contact face, and/or engage progressively with the depression.

In use, if the office chair hits a user's shoe or other item, the shield 1 will help to prevent potentially damaging contact between the shoe and the wheel, for example if part of the shoe is run over and becomes trapped under the wheel. The cushion helps to prevent scrape marks or scuffing, which are undesirable on 'smart' or office style shoes.

The embodiment described above, and as shown in the figures, is for an office chair. The shield 1 could also be used for any other wheeled object that uses caster wheels, such as for example supermarket trollies, hospital beds, or similar.

Figure 6:
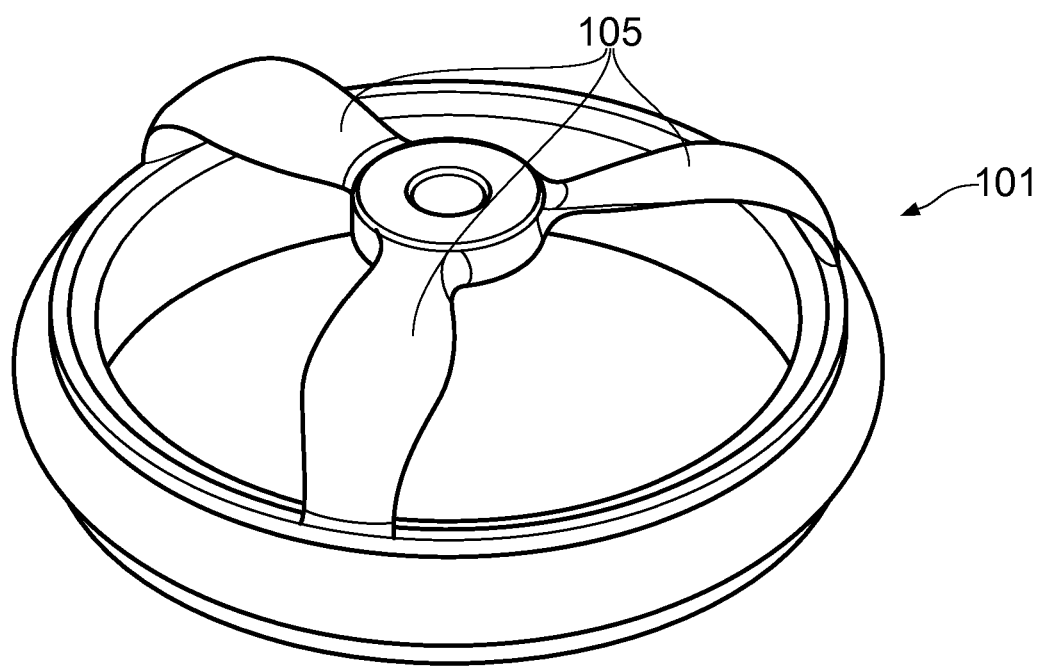
FIG. 6 shows a perspective view from above and to one side of another embodiment of the caster wheel shield of the present invention.

Many variations to the shield described above are possible, such as the caster wheel shield 101 shown in FIG. 6. This has arms 105 of a different shape to those of the previous example which has arms 5 that decrease in width towards the upper end.

The embodiment shown in FIG. 6 has arms 105 that widen at a mid-point along the length and then taper at where the arms attach to the perimeter wall and the hole on the upper end.

In other variations, a single arm could be used to connect between the chair and perimeter wall. The perimeter wall could also extend partially round the perimeter of the wheel, and be broken in one or more locations.

FIG. 7 shows an embodiment of the shield 1 having three arms 5 with the resiliently deformable portion 4 removed revealing the depression/recess 7 in which the resiliently deformable portion is fitted in use.

The recess 7 includes an aperture 3 suitable for receiving a user's finger so that the user can push away the resiliently deformable portion 4 enough so that it may be eased off the shield.

It is appreciated that other objects, such as a pen, may be used to aid with displacing the resiliently deformable portion 4.

Figure 8:
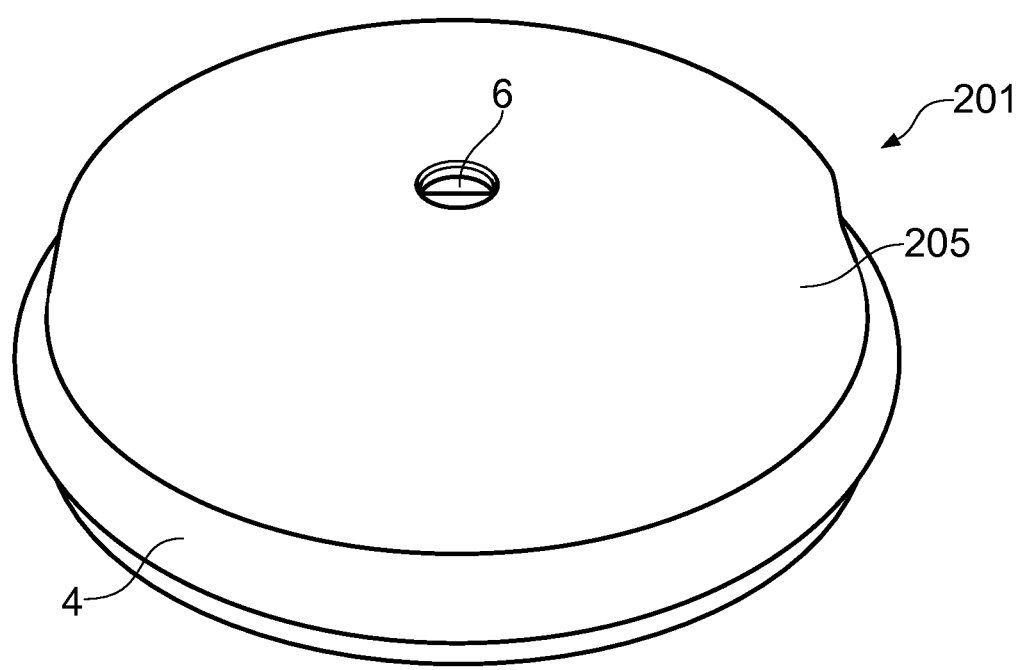
FIG. 8 shows a perspective view from above of another embodiment of the caster wheel shield of the present invention.

Alternatively, as shown in FIG. 8 the shield 201 has an extension arm 205 that is formed to extend around the entire top edge of the perimeter wall of the caster wheel shield 201 to form a dome. In this way the caster wheel is fully enclosed by the shield with no gaps or spacing through which the user can contact the caster wheel in use.

Figure 9:
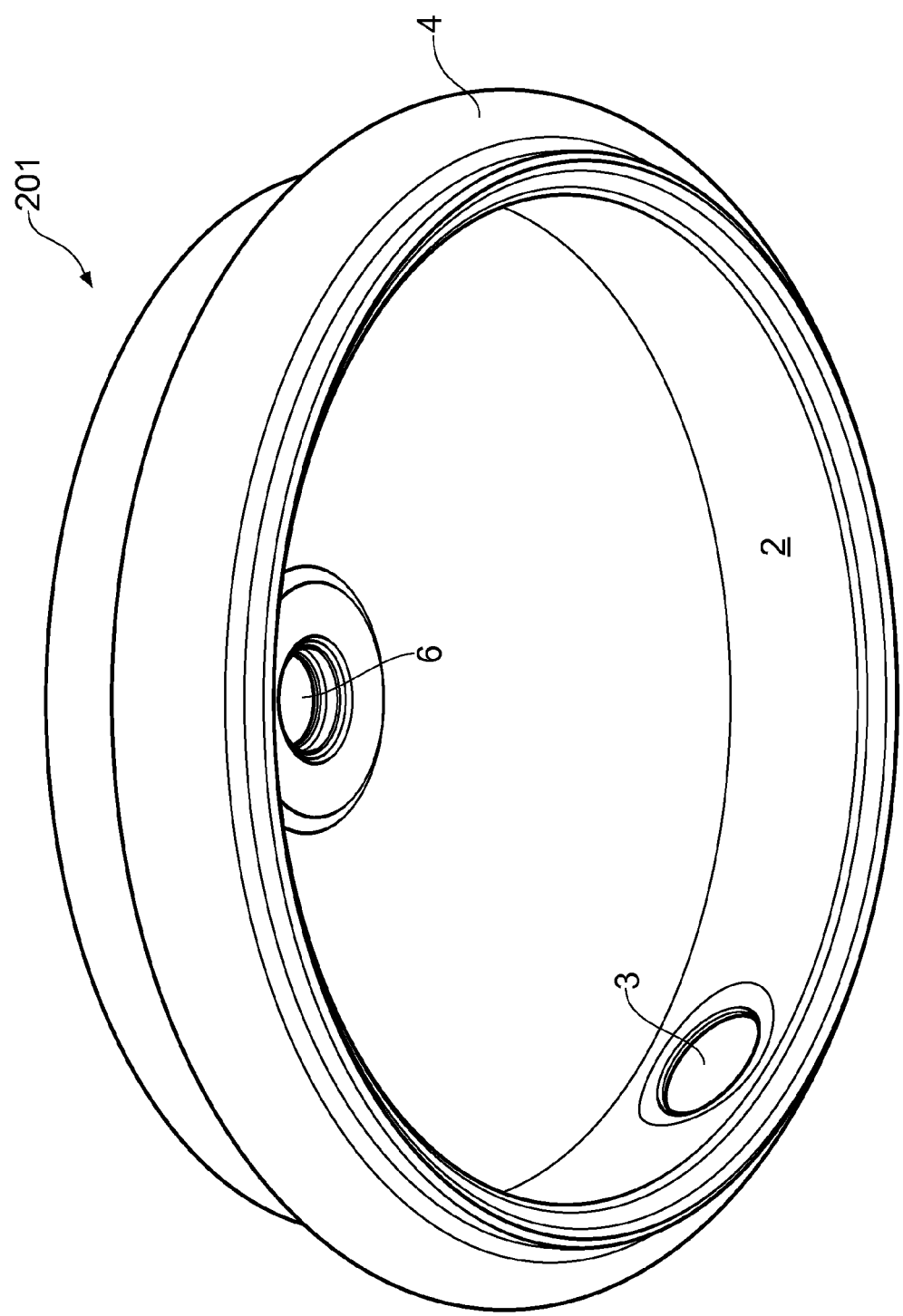
FIG. 9 shows a perspective underside view of the embodiment shown in FIG. 8 revealing the aperture that aids with removal of the resiliently deformable portion.

FIG. 9 shows an underside view of the dome shaped shield 201 wherein the aperture 3 is visible on the inner face of the perimeter wall 2. An object such as the user's finger is pressed through the hole from the inner face of the perimeter wall 2 so as to permit the resiliently deformable portion 4 to be spaced apart from the perimeter wall so that it can be eased away from the recess 7 (not shown in FIG. 9).

FIG. 10 shows the dome shaped shield 201 with the resiliently deformable portion 4 removed so as to show the aperture 3 on the outer face of the perimeter wall 2.

Figure 11A:
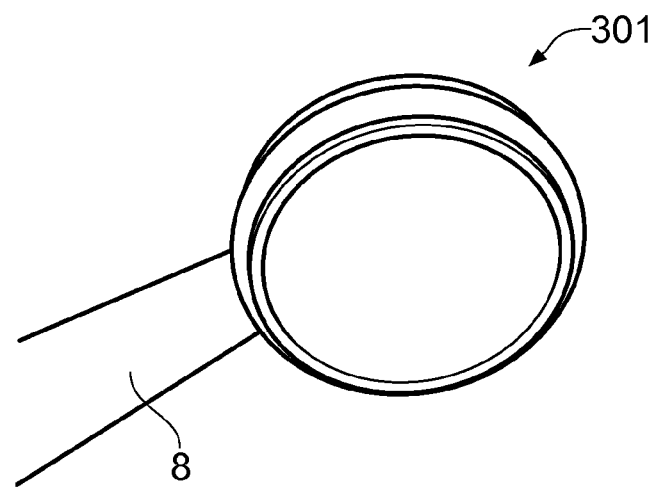
FIG. 11A shows a perspective underside view of another embodiment of a shield.
Figure 11B:
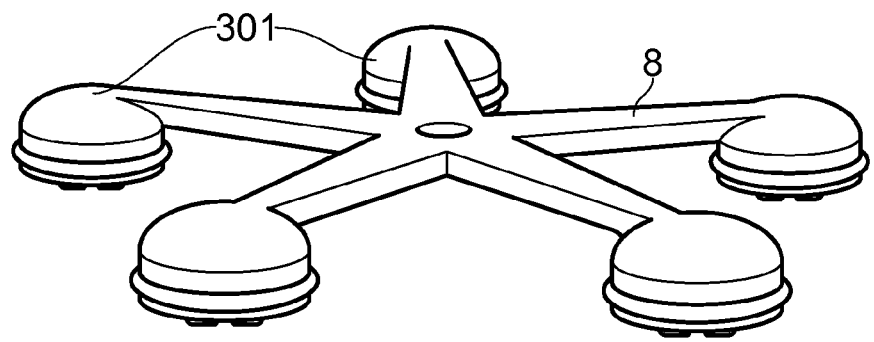
FIG. 11B shows an overview of an array of shields arranged on a chair base.
Figure 11C:
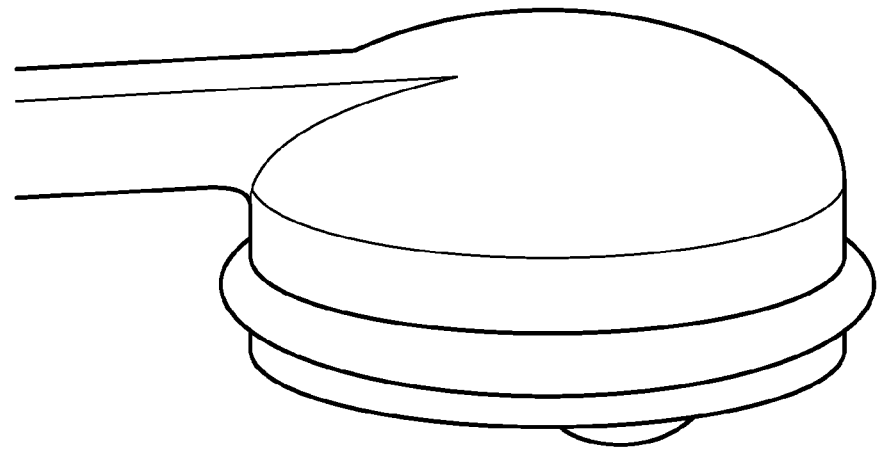
FIG. 11C shows a side view of the shield shown in FIGS. 9A and 9B.

FIGS. 11A, 11B and 11C show another embodiment of the shield wherein the shield is integrated with a chair base 8. The chair base 8 is received on a side of the shield 301 as opposed to an upper region of the shield.

The invention has been described by way of examples only and it will be appreciated that variation may be made to the above-mentioned embodiments without departing from the scope of invention as defined by the claims.

The invention claimed is:

1. A shield for a caster wheel comprising:
    a perimeter wall extending substantially fully around a perimeter of an omni-directional caster wheel, a lower portion of the perimeter wall being secured at a constant level with respect to the caster wheel so as never to come in contact with ground,
    a resiliently deformable portion mounted around an outer surface of the perimeter wall, and
    at least three individual extension arms between the perimeter wall and a connection point to connect the shield to the caster wheel.

2. The shield for a caster wheel according to claim 1, wherein:
    the resiliently deformable portion extends substantially fully around the lower portion of the perimeter wall.

3. The shield for a caster wheel according to claim 1, wherein:
    the at least three individual extension arms extend inwardly and upwards from a top of the perimeter wall to the connection point to connect the shield to the caster wheel.

4. The shield for a caster wheel according to claim 1, wherein:
    the at least three individual extension arms are regularly spaced apart from each other around the perimeter wall.

5. The shield for a caster wheel according to claim 1, wherein:
    an upper end of each of the at least three individual extension arms meet to create a single connection point.

6. The shield for a caster wheel according to claim 1, wherein:
    the connection point comprises a hole configured to receive a connector portion of the caster wheel therethrough.

7. The shield for a caster wheel according to claim 1, wherein:
    the perimeter wall and the at least three extension arms forming the connection point are formed as a unitary item.

8. The shield for a caster wheel according to claim 7, wherein:
    the perimeter wall and the at least three extension arms are formed from plastic.

9. The shield for a caster wheel according to claim 7, wherein:
    the perimeter wall and the at least three extension arms are formed from metal.

10. The shield for a caster wheel as claimed in claim 1, wherein the resiliently deformable portion comprises:
    a cushion.

11. The shield for a caster wheel according to claim 10, wherein the resiliently deformable portion further comprises:
    an elasticated backing band, the cushion being connected to an outer face of the elasticated backing band,
    wherein the elasticated backing band contracts to hold the resiliently deformable portion in position on the perimeter wall, and extends to remove the resiliently deformable portion from the perimeter wall.

12. The shield for a caster wheel according to claim 11, wherein the perimeter wall further comprises:
    a central depression running around the outer surface of the perimeter wall, a width of the elasticated backing band being substantially the same as a width of the central depression.

13. The shield for a caster wheel according to claim 1, wherein the perimeter wall further comprises:
    at least one aperture adjacent to the resiliently deformable portion.

* * * * *